(12) United States Patent
Driskill et al.

(10) Patent No.: US 7,844,360 B2
(45) Date of Patent: Nov. 30, 2010

(54) SYSTEMS AND METHODS FOR PROCESSING PACKAGED GOODS IN THE NATURE OF CIGARETTES

(75) Inventors: David Driskill, Greenville, SC (US); Steven Morrison, Piedmont, SC (US); Richard Froehlich, Lincoln, NE (US)

(73) Assignee: Velociti Alliance North America, Inc., Greenville, SC (US)

( * ) Notice: Subject to any disclaimer, the term of this patent is extended or adjusted under 35 U.S.C. 154(b) by 771 days.

(21) Appl. No.: 11/717,612

(22) Filed: Mar. 13, 2007

(65) Prior Publication Data
US 2007/0255448 A1 Nov. 1, 2007

Related U.S. Application Data

(60) Provisional application No. 60/795,931, filed on Apr. 27, 2006, provisional application No. 60/847,033, filed on Sep. 25, 2006.

(51) Int. Cl.
*G06F 7/00* (2006.01)
(52) U.S. Cl. ................. 700/223; 700/224; 700/213
(58) Field of Classification Search ............. 700/213; 414/749; 131/109.1
See application file for complete search history.

(56) References Cited

U.S. PATENT DOCUMENTS

| | | | |
|---|---|---|---|
| 5,794,789 A * | 8/1998 | Payson et al. | 209/549 |
| 6,610,954 B2 | 8/2003 | Takizawa | 209/583 |
| 6,651,820 B2 | 11/2003 | Takizawa | 209/546 |
| 6,680,452 B2 | 1/2004 | Takizawa | 209/583 |
| 6,685,031 B2 * | 2/2004 | Takizawa | 209/546 |
| 7,038,279 B2 * | 5/2006 | Kraz et al. | 257/355 |
| 2002/0175112 A1 | 11/2002 | Takizawa | 209/608 |
| 2005/0246056 A1 * | 11/2005 | Marks et al. | 700/213 |
| 2007/0187496 A1 * | 8/2007 | Andersen et al. | 235/385 |

* cited by examiner

*Primary Examiner*—Gene Crawford
*Assistant Examiner*—Ramya Prakasam
(74) *Attorney, Agent, or Firm*—Westman, Champlin & Kelly, P.A.

(57) ABSTRACT

Systems and methods for processing tobacco-oriented goods are disclosed. One embodiment of a method includes receiving a pick-up signal from a pick-up sensor. The pick-up signal is indicative of the picking up of a tobacco product unit that has been pre-sorted based on inclusion in an associated order. Also received is a put-down signal from a put-down sensor. The put-down signal is indicative of the fact that the tobacco product unit has been put down. A determination is made, based on a system parameter, whether the pick-up signal is properly associated with the put-down signal.

25 Claims, 10 Drawing Sheets

SYSTEMS AND METHODS FOR PROCESSING PACKAGED GOODS IN THE NATURE OF CIGARETTES

The present application is based on and claims the benefit of U.S. provisional patent application Ser. No. 60/795,931, filed Apr. 27, 2006, and is also based on and claims the benefit of U.S. provisional patent application Ser. No. 60/847,033, filed Sep. 25, 2006, the content of both provisional applications being hereby incorporated by reference in its entirety.

BACKGROUND

Currently, there are many different types of materials handling systems. Typically, such a system will include equipment configured to move items between required locations on an automated and/or manually-initiated basis. Depending on the type of items being handled, some systems may incorporate the functionality of specialized equipment, such as equipment for weighing or performing some other measurement function within the materials handling system.

Some materials handling systems are designed specifically for processing packaged tobacco products, such as cartons of cigarettes. Currently, there are many disadvantages associated with such systems. For example, in terms of operator function, most systems require frequent movement of the operator to the product rather than bringing the product to the operator. Further, while some current systems support the passing of packages of tobacco products through a stamping machine, there are usually significant limitations on the flexibility of the stamping process. Still further, current systems commonly support the sorting of one package to a single order at a time.

The discussion above is merely provided for general background information and is not intended for use as an aid in determining the scope of the claimed subject matter. Also, the claimed subject matter is not limited to implementations that solve any or all disadvantages noted in this background section.

SUMMARY

Systems and methods for processing tobacco-oriented goods are disclosed. One embodiment of a method includes receiving a pick-up signal from a pick-up sensor. The pick-up signal is indicative of the picking up of a tobacco product unit that has been pre-sorted based on inclusion in an associated order. Also received is a put-down signal from a put-down sensor. The put-down signal is indicative of the fact that the tobacco product unit has been put down. A determination is made, based on a system parameter, whether the pick-up signal is properly associated with the put-down signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
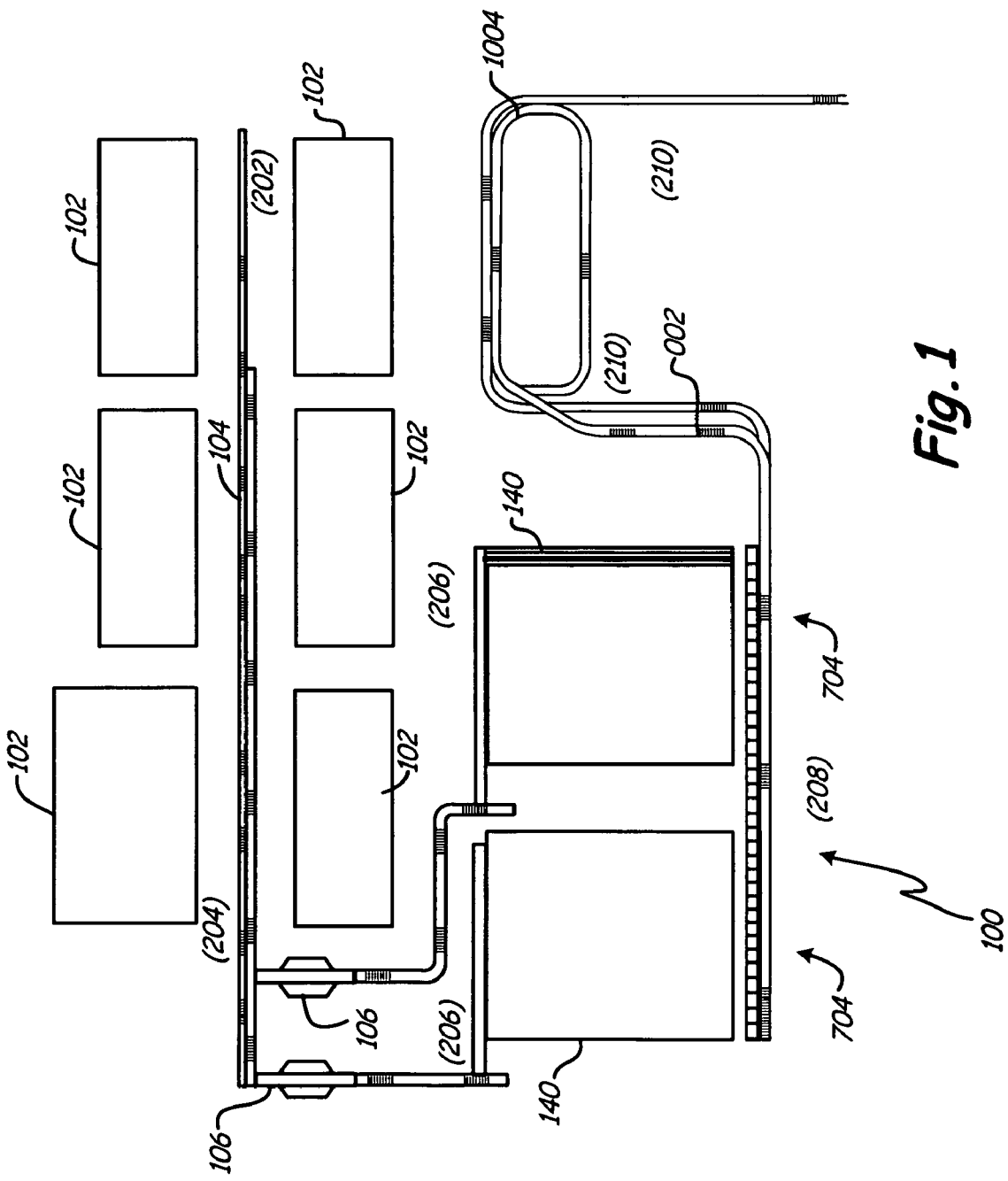
FIG. 1 is schematic diagram of a materials handling system for processing tobacco-oriented goods.
Figure 2:
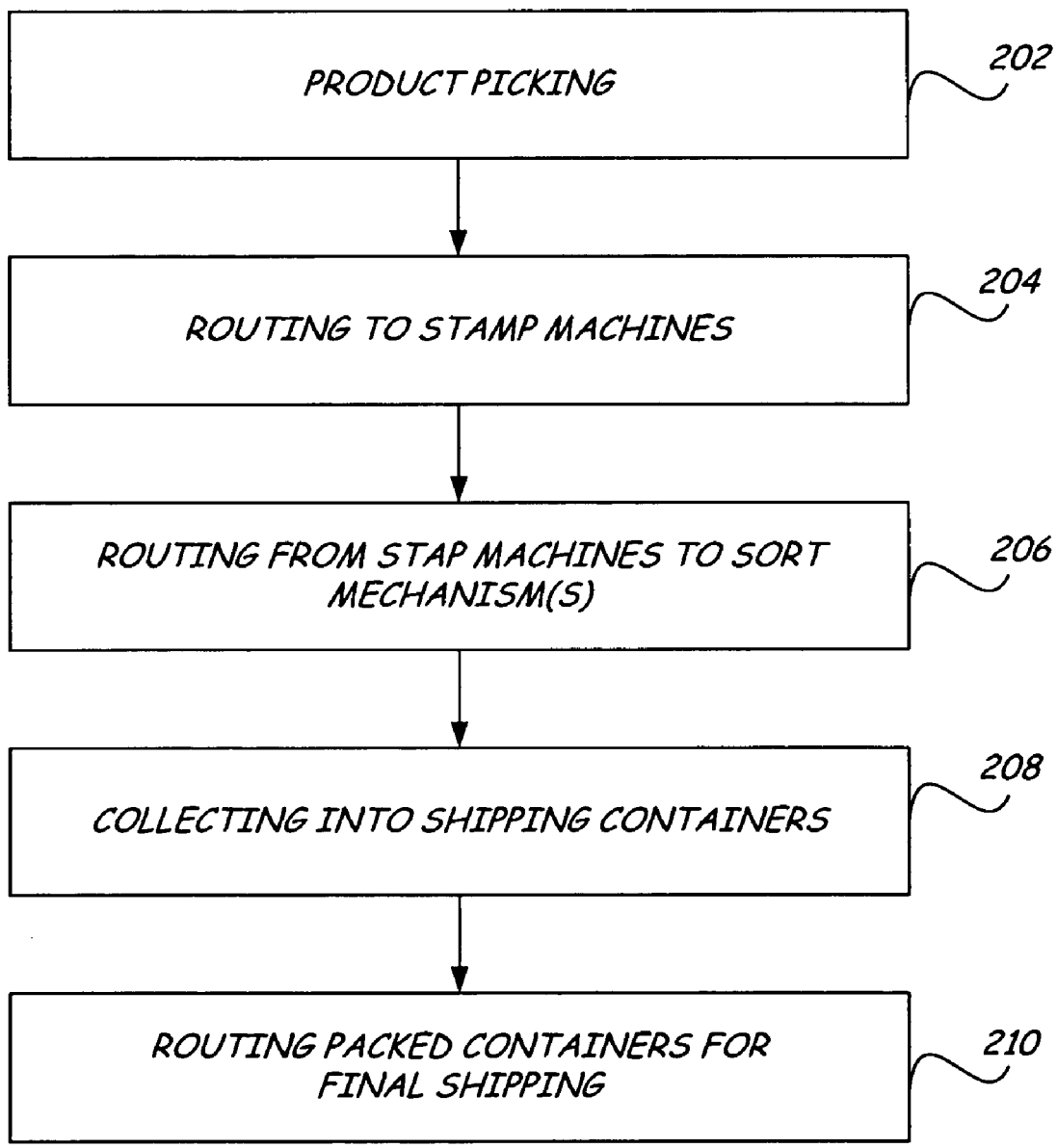
FIG. 2 is a flow chart diagram demonstrating process steps that, in one embodiment, are executed within the materials handling system.
Figure 3:
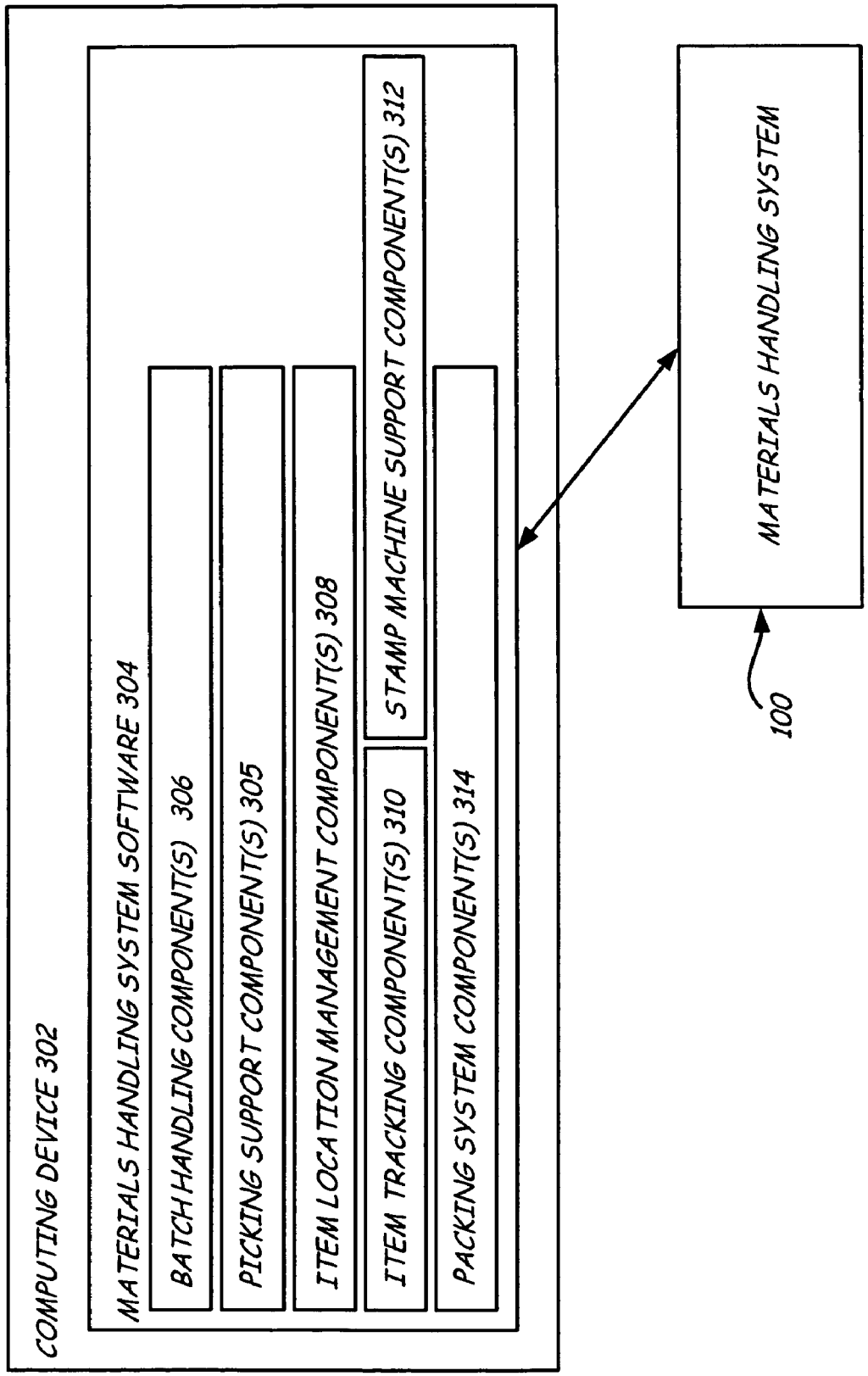
FIG. 3 is a schematic diagram of a computing device with materials handling system software operatively installed thereon.

FIG. 1 is a schematic diagram of a materials handling system 100 for processing packaged tobacco products, such as, but not necessarily limited to, cartons of cigarettes. FIG. 2 is a flow chart diagram demonstrating processing steps that occur within system 102. FIG. 3 is a schematic diagram of a computing device 302 having materials handling system software 304 operatively installed thereon. Software 304 is illustratively configured to facilitate the management of various functions associated with operation of materials handling system 100, many of which will be described in detail below. The components and operation of system 100 will be described in relation to the related process of FIG. 2, as well as in relation to related components of software 304.

In accordance with block 202 in FIG. 2, a first step in the overall materials handling process is product picking. Generally speaking, in the context of FIG. 1, the picking process involves removing cartons of cigarettes from picking stations 102 and placing them onto a conveyor 104 that moves the cartons from right to left (relative to the orientation of FIG. 1).

In one embodiment, software component 305 is configured to interface with system 100 so as to support management of the picking process. The precise details of configuration will vary depending upon the details of a given picking implementation. Without departing from the scope of the present invention, the picking process can be entirely automated, semi-automated or entirely manually accomplished. In one example of a purely manual implementation, a human selects cartons from one or more picking stations 102 based on instructions reflected in a paper-based listing, for example, a paper-based listing of what products should be picked and in what sequence.

In a typical semi-automated picking system, a human selects cartons from one or more of the picking stations 102 based on an electronically supported system that presents automated cues (e.g., visual or audible cues). In one embodiment, a mechanism is employed to verify that human has properly responded to the cues. For example, the system may require the human to provide feedback (e.g., pushing a button, speak a command into a microphone, etc.) to verify compliance with a particular cue, which illustratively triggers initiation of the next cue. An alarm or some other response is illustratively provided if feedback from the human picker is inconsistent with expectations based on the currently active cue.

In a more specific example of a semi-automated picking system, an LED is illuminated to identify a product type (e.g., the identity, SKU and/or location) as the next candidate for picking. The same or a different LED mechanism also indicates the quantity to be picked. Once picked, the LED mechanism or mechanisms are turned off in a manner that indicates compliance with the picking instruction. This may occur in any of a variety of different ways such as, but not limited to, depression of a button by the human picker. Alternatively, the indicator(s) may be automatically extinguished when determined by a sensor (e.g., an electronic eye, a laser sensor, etc.) that the current picking instruction is likely to have been fulfilled.

In another example, an audibly directed picking system is implemented wherein audible commands are transmitted to an operator-worn headset to notify a human operator of the next pick location, quantity, description, check digit for verification purposes, and/or some other form of instruction. In one embodiment, the operator speaks into a microphone to notify the system, via speech recognition, of exceptions and/or pick verification. It should be noted that hybrid systems are also within the scope of the present invention, such as a system wherein visual aids are utilized to provide picking locations and audible cues are utilized to indicate the applicable quantity, exceptions, completions, and/or other picking-related information.

Those skilled in the art will appreciate that the picking implementations provided in the previous paragraphs are simply examples of many alternatives within the scope of the present invention. Fully automated alternatives, such as where machines handle automatically the process of moving cartons to conveyer 104, are also within the scope of the present invention. The present invention is not limited to any one particular means for implementing the picking process.

In one embodiment, not by limitation, picking stations 102 include shelves containing cigarettes in bulk quantities organized by type. For example, cartons of a particular type of Marlboro cigarettes are grouped together in a first location while cartons of a particular type of Camel cigarettes are grouped together in a different location (though a given type might be stocked in more than one location).

In one embodiment, logic is applied to selectively organize and distribute products across and/or within the picking stations 104. For example, certain types of product may be assigned certain locations based on an objective criteria such as, but not necessarily limited to, anticipated quantities needed. In this case, a type likely to be needed relatively frequently might be assigned a location that is easier to access (e.g., by a human) than a location assigned to a type that is likely to be less frequently needed. Or, a type of product likely to be needed in large quantities might be assigned a location that is easier to access than a location assigned to a type that is more likely to be needed in small quantities. One area might be reserved for picking large quantities (e.g., cases of cartons) of a product while another area might be reserved for picking small quantities (e.g., individual cartons) of the same product. Those skilled in the art will appreciate that it is within the scope of the present invention to organize products across and/or within picking stations 102 based on any basis. The basis may include, but is not limited to, the goal of maximizing efficiency (e.g., reducing the amount of movement required for a human participating in the picking process).

Picking instructions are illustratively generated within software system 304 (e.g., by support components 305) and issued into materials handling system 100 as appropriate depending upon the nature of the implemented picking system. In one embodiment, the picking instructions are organized around the concept of an order. For example, all components of a first order are picked (e.g., placed on conveyer 104). Then, then all the components of a second order are picked. This process continues until all orders have been picked. Some efficiency considerations may be worked in to the order-based picking process. For example, certain orders may be given higher priority than others for a variety of different reasons (e.g., truck scheduling, etc.). Or, the components within an order may be organized to minimize how much a human picker must move around while picking the order. However, it is typically true that all components of a first order must be picked before moving on to a second order. To compromise this mandate will typically mean compromising the accuracy of order management downstream in the system.

In one embodiment, as is shown in FIG. 3, materials handling software system 304 includes a batch handling component 306. Component 306 is illustratively a software tool that enables a user to influence the quantity and type of products to be picked, as well as the order in which picking occurs. How this influence is translated to the picking process is dependent upon the nature of the picking system. For example, in one embodiment, in a purely manual system, software component 306 is configured to assist in the generation of a list or lists from which one or more human pickers work. In another embodiment, in a semi-automated system, software component 306 is configured to influence what cues are provided to one or more human pickers. In yet another embodiment, in an automated system, software component 306 is configured to influence the operation of the machines responsible for the picking process. Those skilled in the art will appreciate that the precise functionality of software component 306 is at least partially dependent upon the nature of the applicable picking implementation.

In accordance with one embodiment, picking instructions generated by component 306 are organized around the concept of a batch. Generally speaking, a single batch may contain components from different orders. Typically, components of a first batch are picked followed by the picking of components of a second batch, and so on and so forth until all batches have been picked. The assumption is that orders can be mixed because other mechanisms are utilized downstream in the system in order to organize on an order-specific basis. The components of a batch are typically picked from a single inventory of product (e.g., distributed across picking stations 102). A human participant in a batch-based picking process illustratively may not be aware (e.g., may receive no indication) of what specific order he or she is in the process of picking.

In one embodiment, software component 306 is configured to receive indications of orders and generate corresponding batch-based picking orders in accordance with one or more user-selected and/or default organizing principles. This illustratively, but not necessarily, means combining components of different orders into the same batch. This is not to say that batch-based picking instructions must originate within materials handling system software 306. Those skilled in the art will appreciate that batch-based picking instructions can be generated by an external system and transmitted to software 304 (e.g., to component 306) for processing within the applicable picking system (e.g., system 100).

As has been alluded to, the batch-based picking instructions can be organized based on any of a variety of different user-selected and/or default parameters. For example, not by limitation, software component 306 can be configured to create batches so as to optimize one or more of the following constraints in any combination: 1) desired order completion cutoff time; 2) desired truck route or routs; 3) desired carton size or sizes in a batch; 4) target overall batch size; and/or 5) target work effort to complete the batch. In one embodiment, all available orders are merged into the batching process. In another embodiment; however, software 304 and/or system 100 are configured to support either or both batch-based and order-based picking.

Figure 4:
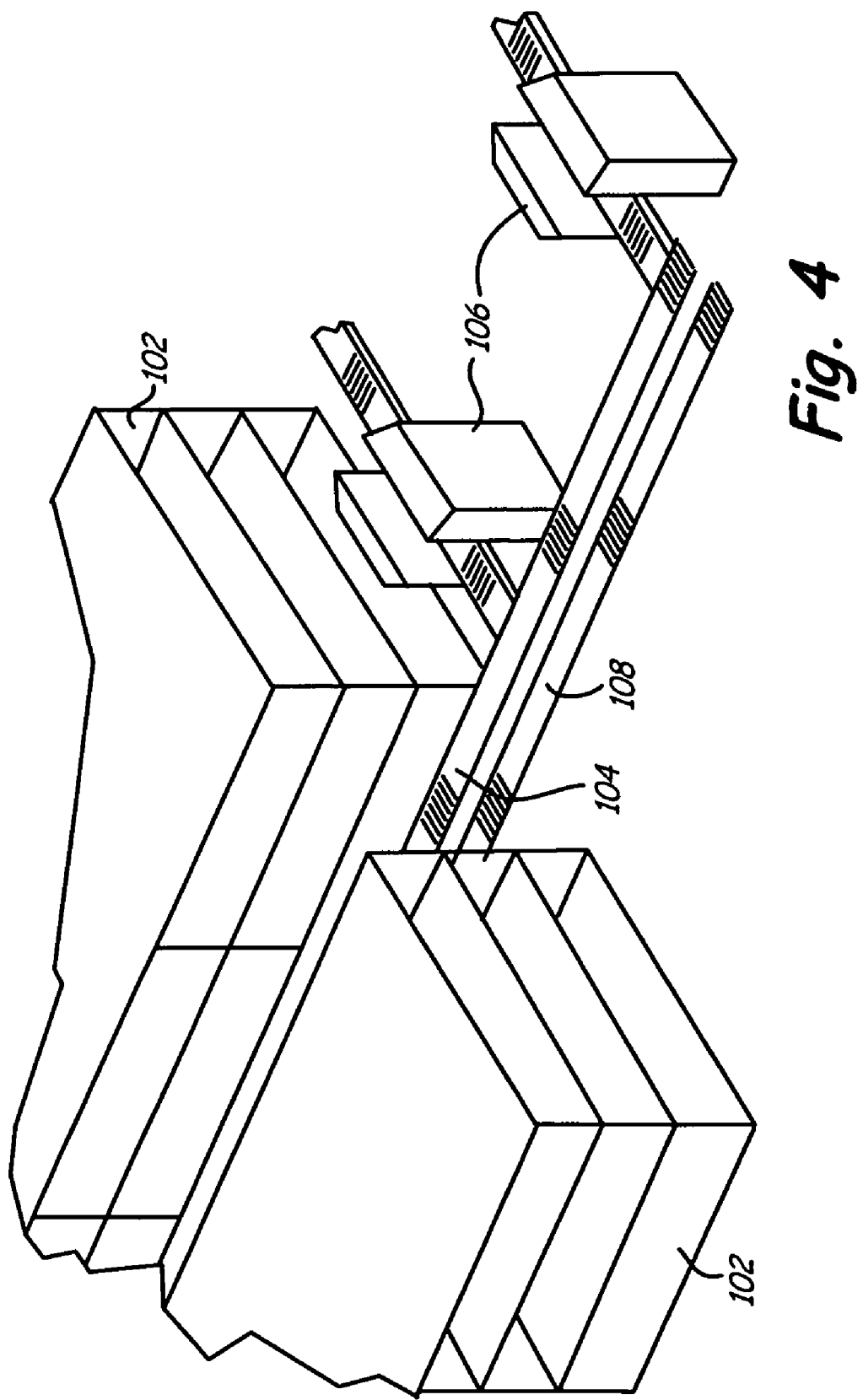
FIG. 4 is a perspective view of a portion of the materials handling system.

FIG. 4 is a perspective view of a portion of system 100. The view shows the two picking stations 102 that are located closest to a pair of stamping machines 106. Stations 102 are shown as empty but would more typically be stocked with products. Conveyer 104 is shown in FIG. 4. Picked cartons of tobacco products move down conveyer 104 toward stamping machines 106.

In one embodiment, items are picked in either case quantities (e.g., 30 cartons per case) or individual cartons (based on picking instructions). Picked cartons are placed on conveyor 104 and, in one embodiment, are oriented such that the widest dimension of the carton is perpendicular to the direction of travel. The flaps of the carton are illustratively oriented so as to be conducive to properly entering stamping machines 106. A second takeaway conveyor 108 is illustratively provided and operates beneath conveyor 104. Case quantities are placed onto the lower conveyor 108.

Thus, an instruction to pick a large quantity of a given product can be picked by placing a case of the product on the lower conveyor and then one or more individual cartons on the upper conveyor as necessary to round out the total number of cartons needed. In one embodiment, such a picking instruction requires the person picking to use their intuition to determine when a case can be picked rather than individual cartons. In another embodiment; however, picking support components 305 are configured to automate such determinations and incorporate the option of case picking into the picking instructions. Depending on exactly how the rest of system 100 is set up, assumptions based on the expectation of one or more cases may or may not be made downstream from the picking process. For example, if an instruction is made to pick a case, then downstream processing may or may not require the case to turn up on the lower conveyor rather than an equivalent amount being picked individually and placed on the upper conveyor. Whether or not there will be such a dependency is a detail that is likely to be implementation-specific.

In accordance with block 204 in FIG. 2, a next step in the process is to route picked products to stamping machines 106. At this point, it is probably a good idea to emphasize that the present invention is not limited to the particular configuration of system components shown in FIG. 1. Those skilled in the art will appreciate that a given implementation is likely to be highly customized to match the given needs of a particular owner or operator. With that in mind, it should be pointed out that the present invention is not limited to incorporating two stamp machines 106. More or fewer stamping machines can be implemented without departing from the scope of the present invention. However, solely for the purpose of describing various aspects of the present invention in detail, the illustrated case of two stamping machines will be assumed.

Figure 5:
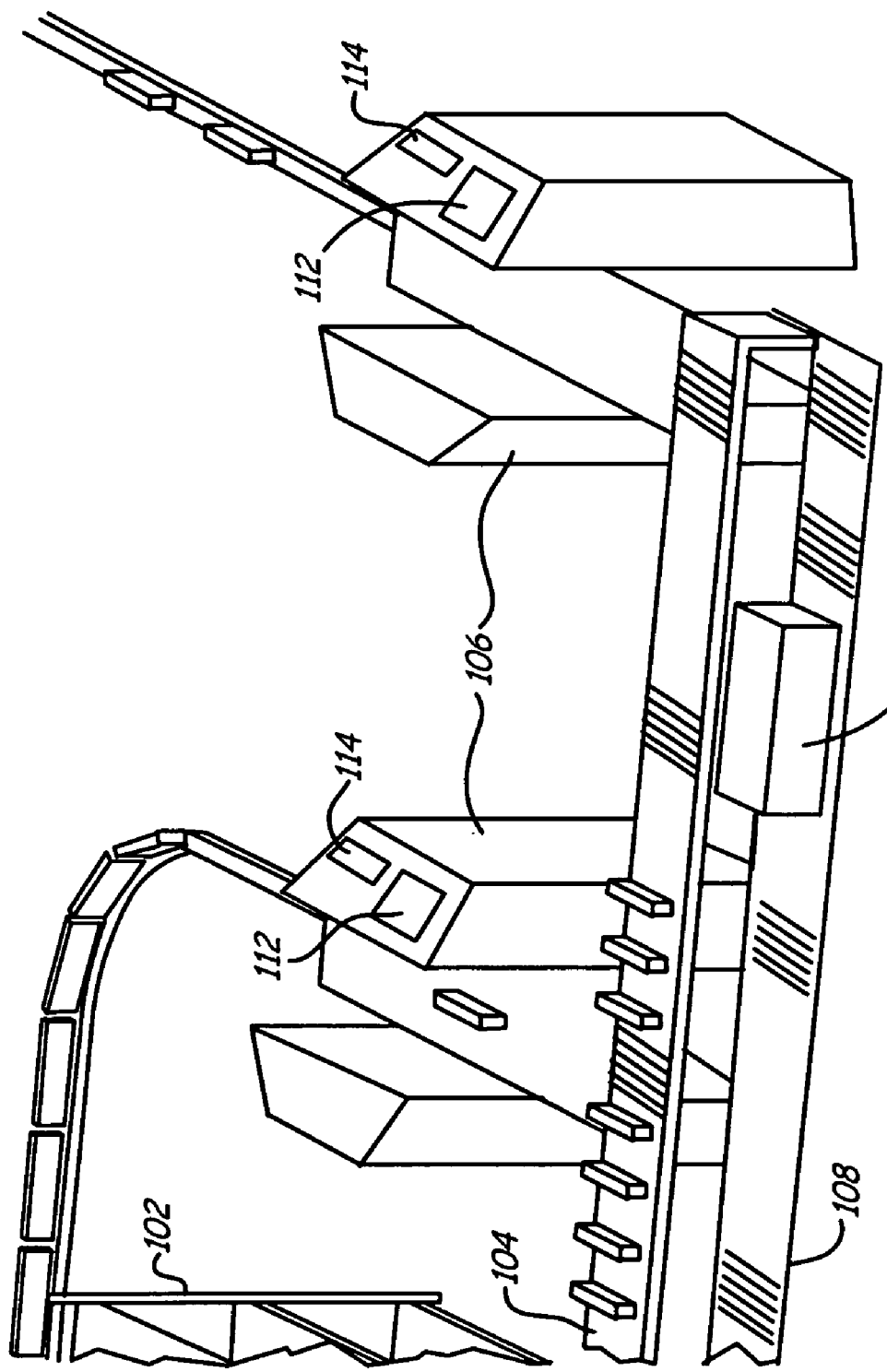
FIG. 5 is a perspective view of a portion of the materials handling system.

In one embodiment, as products exit the picking area and approach the stamp machines, two pick conveyors feed the stamp machines 106. As is shown in FIG. 5, a lower conveyor handles bulk quantities. A case 116, which assumedly contains individual cartons, is shown on the lower conveyor for illustratively purposes. In one embodiment, case quantities are diverted from the lower conveyor into a stamping workstation as determined to be appropriate based on applicable processing parameters. A component of software 304, namely, a location management component 308, is illustratively configured to account for such parameters and trigger mechanical functionality within system 100 as necessary to appropriately move items through the system.

When a case arrives at a stamping work station, a human operator (e.g., an operator of the corresponding stamping machine 106) unloads the cases and manually places the individual cartons onto an induction conveyor associated with the stamp machine. In one embodiment, instructions and/or information related to this bulk unloading task are provided by way of interface 112. In one embodiment, when the task has been completed, an indication of completion is provided to location management component 308 by way of input mechanism 114. When a processing error occurs (e.g., a bulk item does not get unpacked, etc.), an exception is illustratively triggered within component 308 and communicates through operator interface 112. It should be noted that, it is also within the scope of the present invention to make unloading the bulk quantities into the stamp machine an automated process.

Figure 6:
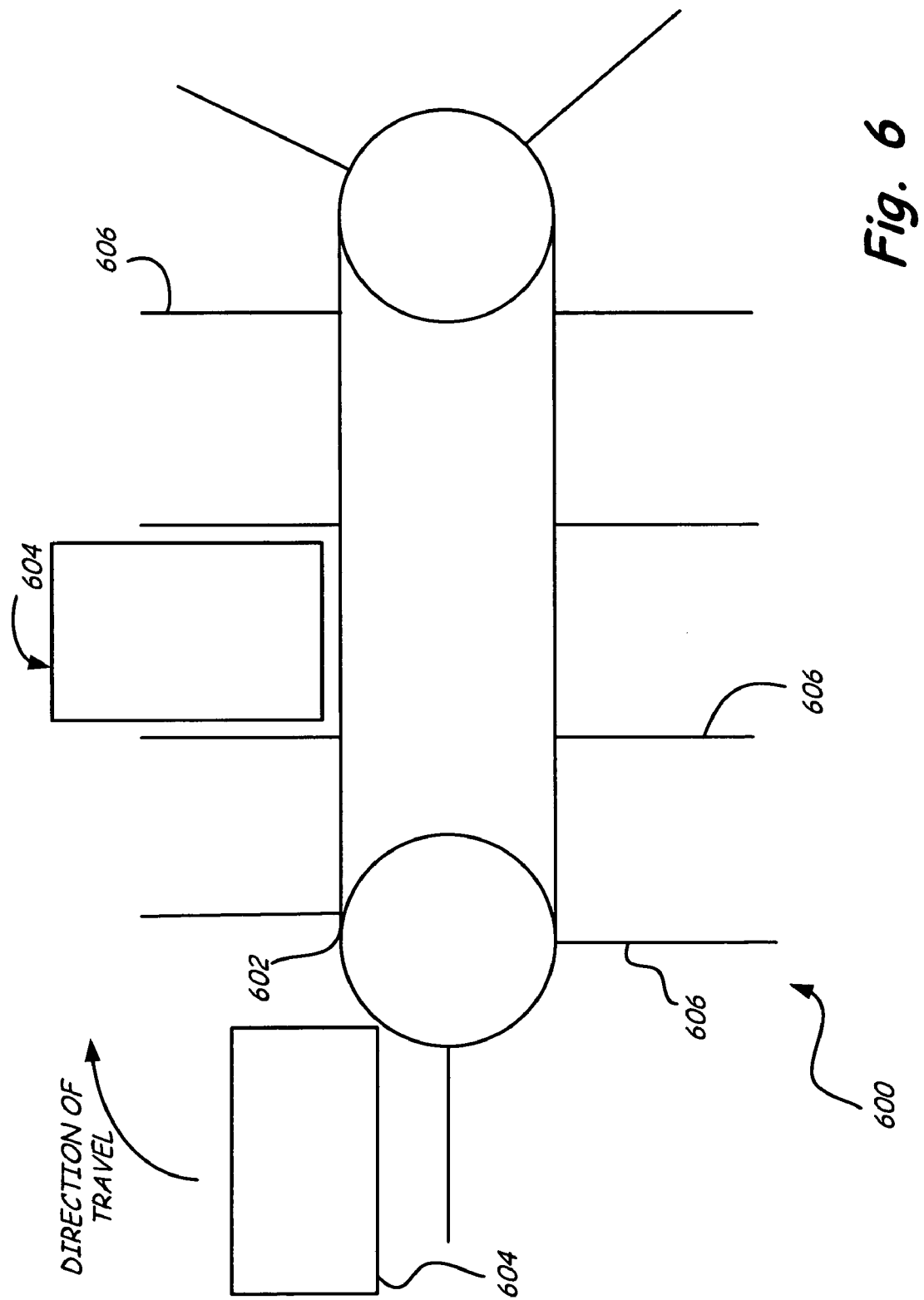
FIG. 6 is a simplified schematic representation of a specialized conveyor system.

In one embodiment, in order to facilitate routing to an appropriate stamping machine 106, individual cartons on the upper conveyor are transferred onto a specialized conveyor system. FIG. 6 is a simplified schematic representation of the specialized conveyor system, which is identified in the Figure as conveyor 600. Conveyor 600 has a plurality of partitions 606 (a representative few of which have been labeled) that extend generally perpendicular to the surface 602 of the conveyor. The spacing between partitions is illustratively slightly more than the narrowest dimension of a carton positioned perpendicular to the direction of conveyor travel.

In one embodiment, as cartons are transferred from the upper conveyor 104 into specialized conveyor system 600 (e.g., similar to the two sample cartons 604 shown in FIG. 6), a reader reads an identifier from each carton. Those skilled in the art will appreciate that this identification process could involve application of any of a number of different identifying technologies including but not limited to an RFID identification system, a barcode identification system, a CCD device identification system, or any other identification system. In one embodiment, this information is fed into an item tracking component 310, which is part of software system 304. Component 310 illustratively associated the carton's ID with its position in the partitioned conveyor 600.

In one embodiment, item location management component 308 receives item location information from item tracking component 310 and utilizes it as a basis for sorting cartons into appropriate stamping machines. For example, as cartons move on conveyor 600 proximate to the entry points of stamping machines 106, component 308 selectively energizes one or more pushing devices to selectively push cartons into appropriate stamping machines. The determination as to the optimum path for a given carton (i.e., which is the correct stamping machine) is illustratively based upon system parameters that are set by system default and/or on a user-selectable basis (e.g., set by an operator of software 304).

In one embodiment, software 304 is configured to support sorting cartons through stamping machines based upon the taxing authority or authorities for which each individual stamping machine is set up to support stamping functionality. It is specifically within the scope of the present invention for multiple taxing authorities to be picked in a single batch. For example, the components of a single picked batch may move through different stamp machines set up to support different taxing authorities. This is particularly interesting in light of the fact that, as has been discussed, a given batch may contain components from more than one order (e.g., multiple orders headed to different locations).

In another embodiment, software 304 is configured to support sorting cartons through stamping machines based upon optimization of the total order fulfillment cycle for a given batch, or for some other measurement standard such as but not limited to a period of an entire shift. Those skilled in the art will appreciate that software 304 can be configured to support sorting cartons through stamping machines based on many different factors in addition to those specifically listed herein, to which the scope of the present invention is not limited.

In one embodiment, cartons may be sorted among stamping machines based upon an administrator- or operator-defined set of rules that are created within software system 304. In one embodiment, if a carton is not destined for any of the stamping machines for any reason, the software is configured to stop the partitioned conveyor, as well as all conveyors upstream as required. Or, in one embodiment, the software is configured to push the carton(s) into an exception handling area, for example. In one embodiment, the handling of such exceptions is configurable based upon an administrator- or operator-selectable option.

Those skilled in the art will appreciate that the display 112 and input mechanism 114 (FIG. 5) associated each stamp machine 106 can be configured to support a variety of different functions. Software system 304 includes stamp machine support components 312 for supporting such functionality.

In one embodiment, as cartons are scanned (e.g., while being moved into conveyor 600), components 312 are configured to indicate on display 112 the quantity of cartons scanned compared against a total required for each stamping machine and/or the tax jurisdiction(s) for which the stamping machine is configured. In one embodiment, components 312 are configured to enable an operator to input (e.g., through mechanism 114, through a touch screen implementation of display 112, etc.) information or exceptions as cartons are stamped. For example, the operator is able to enter commands or notifications to cause software 304 to initiate an appropriate response in unusual circumstances such as, but not limited to, if there is damage to a carton, if a stamping machine becomes inoperable, or if other unusual situations arise during stamping.

In one embodiment, software components 312 are configured to provide, through display 112, instructions for operators who receive full case quantities (e.g., on the lower conveyor coming from the picking area) so that they know how many cartons to remove from the case and route into the stamping machine. For example, it is conceivable that the system may be configured to enable less than all cartons (e.g., less than all 30 cartons) in a bulk amount received to be indicated for processing.

In one aspect of the present invention, as cartons move through stamping machines 106 and are stamped with their unique tax jurisdictional stamp or stamps, an additional step is taken to support the subsequent tracking of each carton within system 100. In one embodiment, a first identifying mark is applied to each carton. The first identifying mark illustratively does not deface the carton and, in one embodiment, is invisible in that it is generally imperceptible to the human eye but can be made visible (e.g., by placing under a black light), and/or is visible to a scanner designed to "see" such marks. In addition or alternatively, a second identifying mark that does deface the carton (e.g., a bar code label) is applied (e.g., blown onto) to each carton. The application and tracking of labels is illustratively managed by one or more of the sub-components of software system 304.

Various embodiments and components of the present invention involve applying identifiers to product units and/or reading identifiers associated with product units. Those skilled in the art will appreciate that these identification processes could involve application of any of a number of different identifying technologies including but not limited to an RFID identification system, a barcode identification system, a CCD device identification system, or any other identification system. To the extent that the present description identifies specific technologies, the specific technologies are provided as but one example of an implementation within the scope of the present invention.

In accordance with block 206 in FIG. 2, a next step in the process is to route cartons from stamp machines 106 to one or more sorting mechanisms 140. In FIG. 1, each stamp machine 106 is associated with a separate sorting mechanism. Those skilled in the art will appreciate that this is not the only configuration within the scope of the present invention.

For example, in one embodiment, multiple stamp machines 106 feed into the same sorting mechanism 140. In another embodiment, one stamp machines feeds into multiple sorting mechanisms 140. In general, it is within the scope of the present invention to customize the configuration of system 100 (add, subtract and/or re-arrange the system components) as necessary to fulfill applicable needs. It is also within the scope of the present invention that software system 304 is flexibly configured to effectively support all such configurations.

In one embodiment, as is generally shown in FIG. 5, cartons are transferred out of a stamp machine 106 and onto a conveyor that is configured to transport the cartons such that the longest dimension travels parallel to the direction of conveyor flow. However, it is also within the scope of the present invention for cartons to be ejected from a stamping machine 106 directly into a sort mechanism 140. Whether cartons are directly or indirectly transferred into a sorting mechanism is dependent on a variety of implementation-specific details such as physical space limitations and configurations at a particular site where a system 100 is to be installed.

In one embodiment, a carton approaches a sorting mechanism 140 and is loaded into a specialized sorting conveyor system. In one embodiment, the specialized sorting conveyor system is configured the same or similar to conveyor 600 shown in FIG. 6. The conveyor has a plurality of partitions that extend generally perpendicular to the surface of the conveyor. The spacing between partitions is illustratively slightly more than the narrowest dimension of a carton positioned perpendicular to the direction of conveyor travel. Cartons feed into the specialized sorting conveyor system as was described in relation to FIG. 6.

Figure 7:
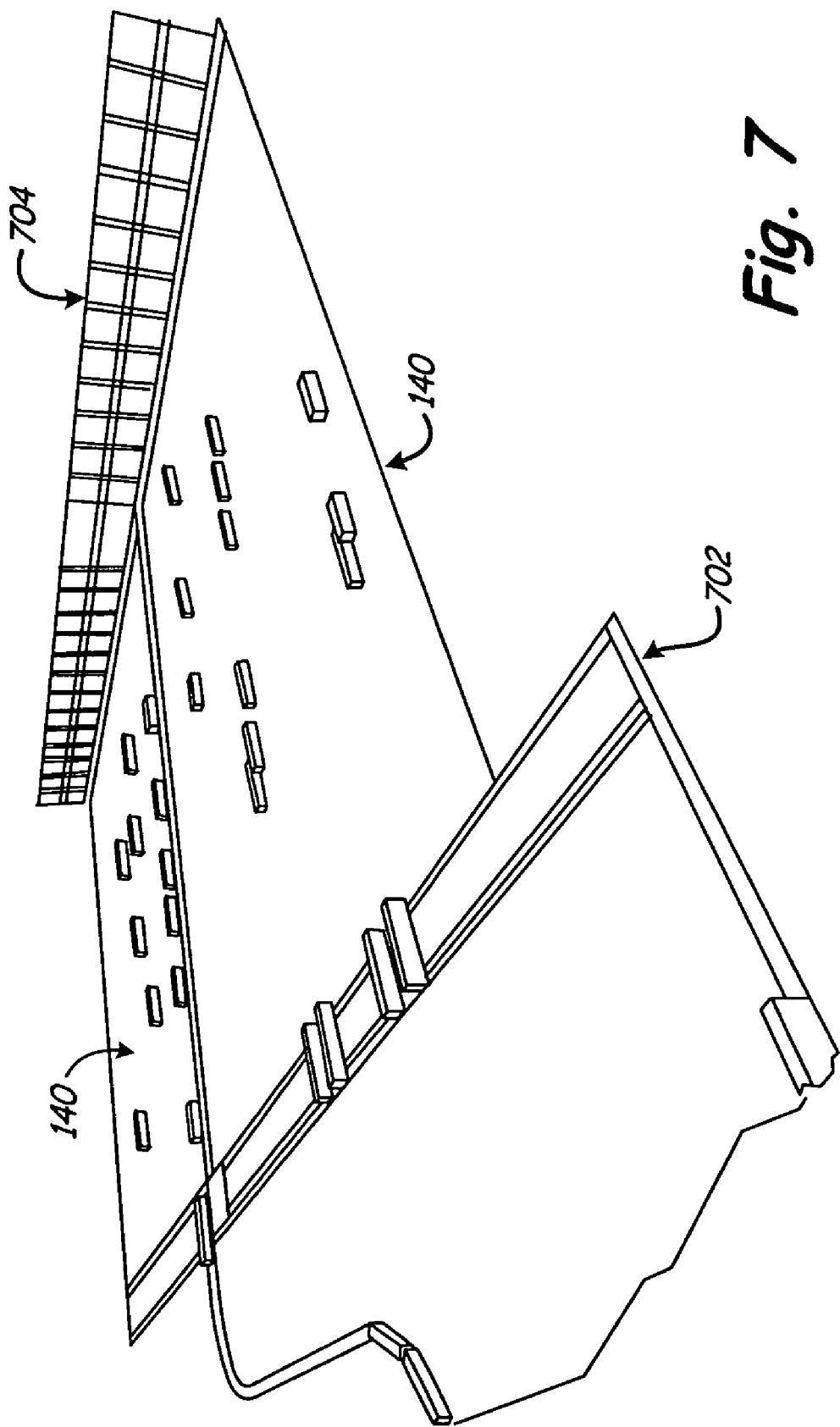
FIG. 7 is a perspective view of a portion of the materials handling system.

FIG. 7 is a schematic illustration demonstrating movement of cartons into and through a sorting mechanism 140. At point 702, cartons are transferred from a conveyor that moves cartons (moving parallel to the longest dimension) to a partitioned conveyor the same or similar to conveyor 600 in FIG. 6 (e.g., wherein cartons are moved perpendicular to the longest dimension). It should be noted that, referring to FIG. 7, the sorting mechanism located more toward the top of the Figure is equipped with its own specialized sort conveyor for moving the other stream of cartons through the other sorting mechanism 140. Also, it should be emphasized that it is also within the scope of the present invention to transfer cartons directly from a stamping machine 106 into one of the partitioned sorting conveyors associated with the sorting mechanism 140.

In one embodiment, as cartons are transferred into the specialized sorting conveyors, a devices reads an identifier associated with each carton (e.g., a barcode scanner reads the manufacturer-applied barcode from each carton) (though this additional item tracking step may be optional for a given implementation). Those skilled in the art will appreciate that this identification process could involve application of any of a number of different identifying technologies including but not limited to an RFID identification system, a barcode identification system, a CCD device identification system, or any other identification system. In one embodiment, this information is fed into item tracking component 310, which is part of software system 304. Component 310 illustratively associated the carton's ID with its position in the partitioned conveyor.

In one embodiment, item location management component 308 receives item location information from item tracking component 310 and utilizes it as a basis for selectively ejecting cartons (e.g., by selectively energizing one or more pushing mechanisms) onto a takeaway conveyer. FIG. 7 shows ejected cartons moving (longest dimension parallel to the direction of motion) along the takeaway conveyor toward a plurality of boxes 704. The determination as to the optimum path for a given carton (i.e., which boxes 704 to move toward) is illustratively based upon system parameters that are set by system default and/or on a user-selectable basis (e.g., set by an operator of software 304).

Thus, as a carton moves into the eject window of a conveyor, a pushing mechanism ejects the carton onto the takeaway conveyor. In one embodiment, the ejection determination is based at least in part on the order to which the carton is assigned (e.g., the assignment of orders being tracked by a component of software 304).

Those skilled in the art will appreciate that it is within the scope of the present invention to adjacently line up multiple takeaway conveyors. In one embodiment, each takeaway conveyor has its own specialized sorting conveyor system (e.g., similar to conveyor 600), the hardware and software being configured to appropriately route a given carton to the takeaway conveyor associated with the carton's final destination while bypassing the other takeaway conveyors. In another embodiment, a single specialized sorting conveyor feeds multiple takeaway conveyors (e.g., the carton moves along all the takeaway conveyors until ejection from the specialized sorting conveyor is appropriate based on system parameters).

Regardless of the configuration of sorting mechanisms 140, and regardless of whether there is more than one, the purpose of the mechanism or mechanisms is illustratively to sort the cartons based on parameters set within software 304. The parameters are indicative of one or more bases for organization such as but not limited to order-oriented organization. Those skilled in the art will appreciate that software 304 can be configured to support sorting cartons through sorting mechanisms 140 based on many different factors in addition to order-oriented organization, to which the scope of the present invention is not limited. In one embodiment, cartons may be sorted based upon an administrator- or operator-defined set of rules that are created within software system 304. Finally, it is worth specifically pointing out that it is within the scope of the present invention for cartons to be picked on a batch-oriented basis (e.g., with multiple orders distributed across a single batch) and then, after the stamping process, sorted on an order-specific or some other basis.

Figure 8:
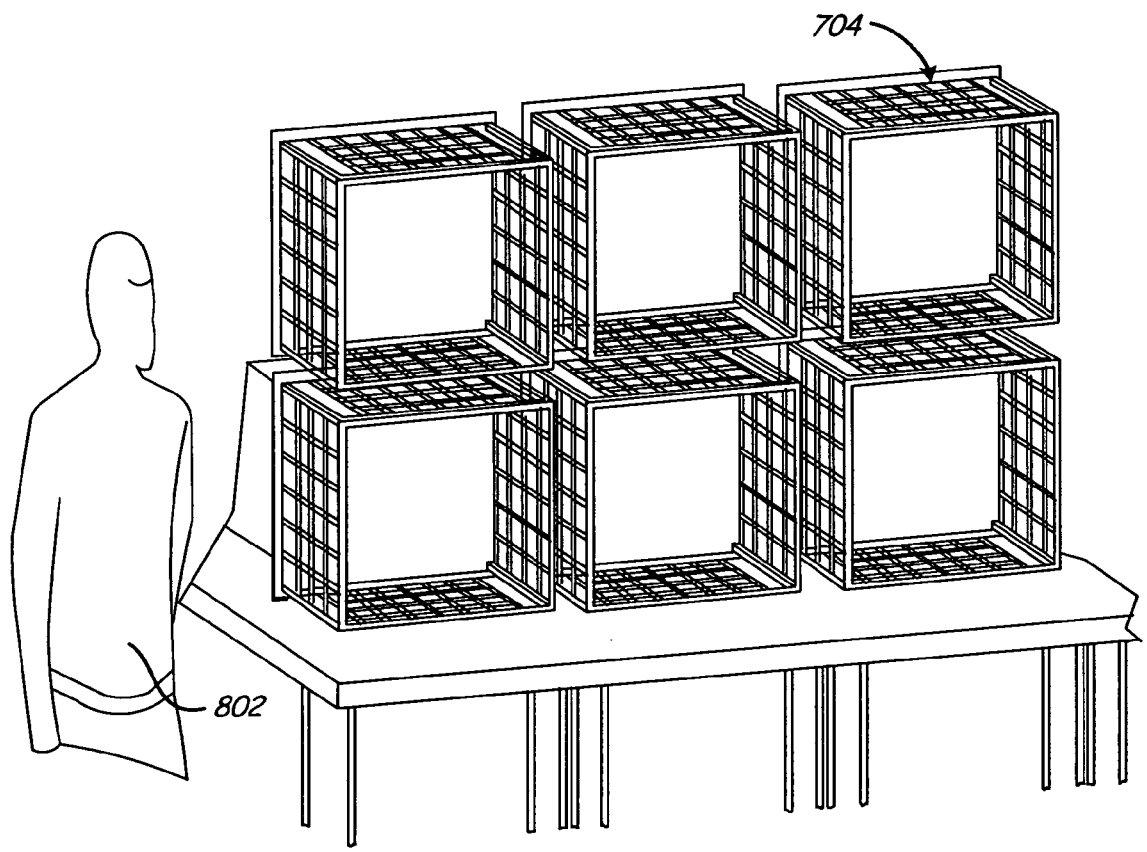
FIG. 8 is a perspective view of a portion of the materials handling system.

In accordance with step 208, a next step in the process is to collect the cartons from the end of the sorting mechanism takeaway conveyers and pack them into boxes 704. When cartons arrive at the end of the sort mechanism takeaway conveyor, they are sorted to the extent that an operator can simply pick them up directly from the end of the conveyor and place them into a corresponding box 704. FIG. 8 is a schematic illustration showing an operator 802 standing in front of boxes 704.

Cartons that are grouped along parallel sort mechanism takeaway conveyors are presented for packing in such a manner that multiple cartons can be picked up and packed into boxes 704 in a single motion (as opposed to packing cartons one at a time). The packer must, however, still determine how many cartons to pack into which boxes. Without departing from the scope of the present invention, the process of moving cartons from the end of the sorting mechanism takeaway conveyor into boxes 704 can be entirely automated, semi-automated or entirely manually accomplished. Packing system software components 314 are illustratively configured to support the implemented packing functionality.

In one example of a purely manual implementation, a human operator picks up the cartons and simply places them in pre-assigned boxes. The operator may be guided by instructions reflected in a paper-based listing, for example, a paper-based listing of what products should be packed where. In one embodiment, software component 314 is configured to support the generation of the paper-based listing based on default and/or administrator- or operator-selectable system parameters.

In one embodiment of a semi-automated implementation, the operator picks up cartons and decides which box to put them based on an electronically supported system that presents automated cues (e.g., visual or audible cues). In one embodiment, a mechanism is employed to verify that human has properly responded to the cues. For example, the system may require the human to provide feedback (e.g., pushing a button, speak a command into a microphone, etc.) to verify compliance with a particular cue, which illustratively triggers initiation of the next cue. An alarm or some other response is illustratively provided if feedback from the operator is inconsistent with expectations based on the currently active cue. In one embodiment, software component 314 is configured to support the management of the semi-automated packing process (including the handling of exceptions or errors) based on default and/or administrator- or operator-selectable system parameters.

In a more specific example of a semi-automated implementation, an LED is illuminated to identify cartons (e.g., the identity, SKU and/or location) as the next candidate for packing. The same or a different LED mechanism also indicates the quantity to be packed. The same or different LED mechanism identifies what box to pack the cartons in. Once packed, the LED mechanism or mechanisms are turned off in a manner that indicates compliance with the picking instruction. This may occur in any of a variety of different ways such as, but not limited to, depression of a button by the operator. Alternatively, the indicator(s) may be automatically extinguished when determined by a sensor (e.g., an electronic eye, a laser sensor, etc.) that the current picking instruction is likely to have been fulfilled. In one embodiment, software component 314 is configured to support the management of the semi-automated process (including the handling of exceptions or errors) based on default and/or administrator- or operator-selectable system parameters.

In another example, an audibly directed system is implemented wherein audible commands are transmitted to an operator-worn headset to notify a human operator of the next box to pack in, a quantity to be packed, and/or some other form of instruction. In one embodiment, the operator speaks into a microphone to notify the system, via speech recognition, of exceptions and/or packing verification. It should be noted that hybrid systems are also within the scope of the present invention, such as a system wherein visual aids are utilized to provide packing locations and audible cues are utilized to indicate the applicable quantity, exceptions, completions, and/or other packing-related information. In one embodiment, software component 314 is configured to support the management of the packing process (including the handling of exceptions or errors) based on default and/or administrator- or operator-selectable system parameters.

In one embodiment, pick-up sensors are provided at the carton pick-up point on the proximal end of the sorting mechanism takeaway conveyor. The sensors are illustratively configured to produce a signal indicating when cartons have been picked up, and to identify which parallel row of the sorting takeaway conveyor the picked up cartons belong to. Put-down sensors are illustratively provided proximate boxes 704 and are configured to identify in which box 704 picked up cartons have been placed.

Figure 9:
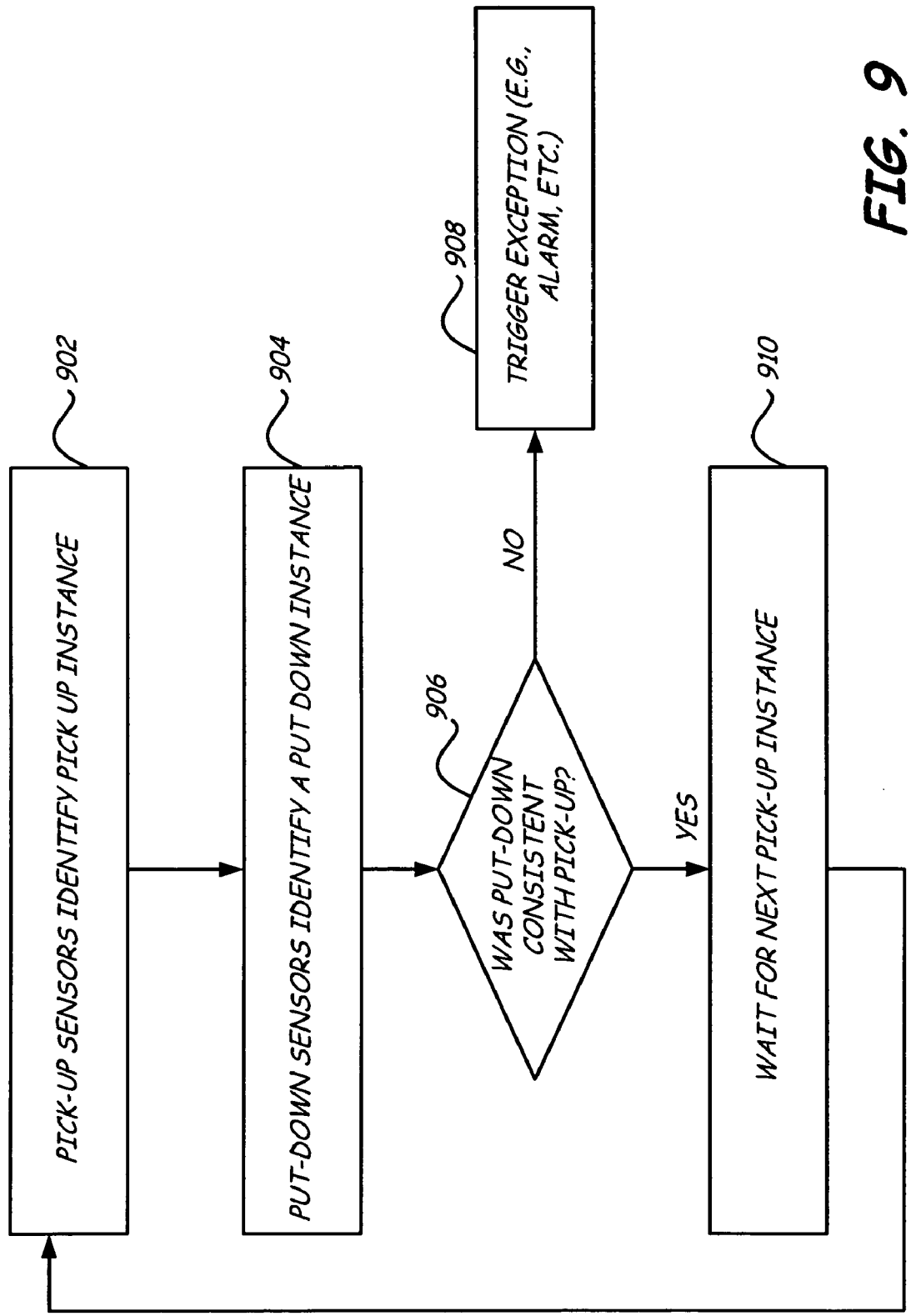
FIG. 9 is a flow chart diagram demonstrating steps associated with a packing process.

FIG. 9 is a flow chart diagram demonstrating steps associated with one implementation of pick-up and put-down sensors. In accordance with box 902, pick-up sensors identify a pick-up instance. In accordance with block 904, put-down sensors identify a putdown instance. In accordance with block 906 a determination is made as to whether the put-down is consistent with the pick-up (e.g., whether it was an accurate put-down). If not, in accordance with box 908, an exception or error-handling process is initiated (e.g., an alarm is triggered, etc.). In accordance with box 910, if the put-down was accurate, the process is repeated following the next sensed pick-up instance. In one embodiment, software component 314 is configured to support the management of the pick-up/put-down process (including the handling of exceptions or errors) based on default and/or administrator- or operator-selectable system parameters. In one embodiment, the described pick-up/put-down system is implemented in conjunction with a system, such as but not limited to those described herein, for instructing the operator as to which items to pick up and where to put them.

Those skilled in the art will appreciate that the implementations provided in the previous paragraphs are simply examples of many alternatives within the scope of the present invention. Fully automated alternatives, such as where machines handle automatically the process of moving cartons into boxes 704, are also within the scope of the present invention. The present invention is not limited to any one particular means for implementing the packing process.

In accordance with one embodiment, one or more display panels are made visible to an operator responsible for packing boxes 704. When a shipping container (i.e., a box 704) is full, software system 304 causes the display panel(s) to show a graphical depiction of what the full container should look like from the operator's point of view. For example, the brand logos on the end of the cartons collectively form an image of sorts. The operator compares the graphical representation on the display panel to the appearance of the cartons in a full box. In this manner, the operator uses the display panel as a mechanism to verify that the shipping container has been properly filled. In one embodiment, filling exceptions or errors are reported and/or corrected by interacting with software system 304 through inputs into the display panel or an associated input mechanism.

In one embodiment, after a container (e.g., a box 704) has been properly filled, a shipping label is manually or automatically applied (though it is also within the scope of the present invention to apply the shipping label before or during the packing process). In one embodiment, the box content (e.g., by SKU, by quantity, etc.) is indicated on the label. Once labeled, the container is put on a takeaway conveyor. In one embodiment, with reference to FIG. 8, user 802 can send out a fully packed and labeled box 704 simply pushing the box backwards onto a takeaway conveyor located behind the boxes.

Figure 10:
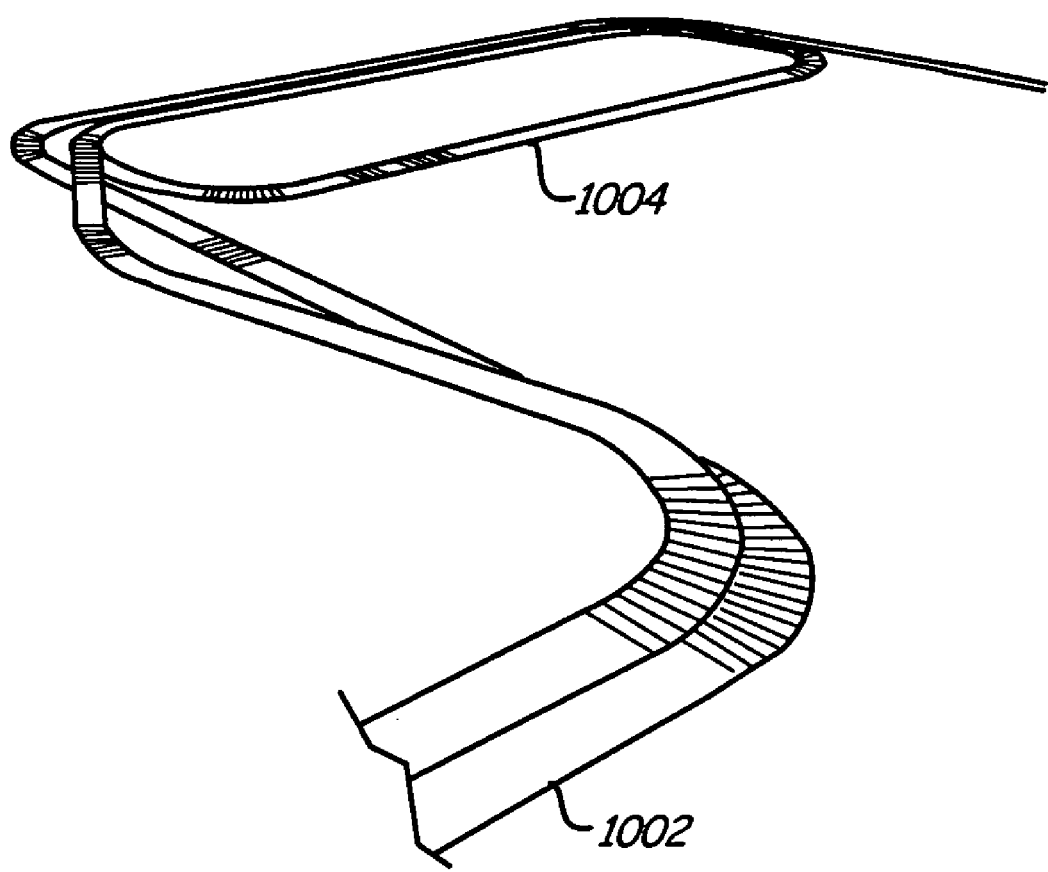
FIG. 10 is a perspective view of a portion of the materials handling system.

In accordance with block 210, another step in the process is the routing of the packed containers for final shipping. FIG. 10 is a schematic representation of an accumulation area 1004. Full containers (e.g., the containers pushed back onto takeaway conveyors by user 802 in FIG. 8) are moved into the accumulation area on conveyors 1002. Two conveyors, an upper conveyor configured to move boxes 704 stacked on top and a lower conveyor configured to move boxes 704 stacked on bottom, are shown in FIGS. 1 and 8. However, more or fewer takeaway conveyors can be implemented to support a particular packing station configuration (e.g., to support more or fewer sorting mechanisms 140).

In one embodiment, as containers approach accumulation area 1004, a reader (e.g., a radio frequency reader, a barcode reader, etc.) is configured to identify the packages. Based on default and/or administrator- or operator-defined parameters set within software system 304, some packages are illustratively diverted into the accumulation area 1004, while other packages may be allowed to continue past the accumulation area to a shipping area. Shipping containers in the accumulation area are illustratively re-circulated, read, and routed to the shipping area when system parameters indicate that such action is appropriate.

There are a variety of interesting features associated with the embodiments of materials handling systems described herein. For example, various system components enable products to be brought to a human operator rather than requiring the operator to move to the products.

Further, sorting mechanism 140 is configured to sort products into specific orders, rather than requiring operators to pick up the products and sort them, for example based on digital lights, etc.

Further, products can be routed through multiple stamping machines while maintaining product identity. If one stamping machine is stamping for one state, a second stamping machine can be stamping for a different state. However, orders from both states can be picked in the same batch.

Further, multiple products can be handled simultaneously. For example, at the end of sorting mechanism 140, multiple cartons (e.g., six cartons) can be picked up. Cartons can be picked up in groups of three, two, six, etc.). In one embodiment, due to the functionality of a sorting mechanism 140, when the operator retrieves a group of cartons, the cartons come directly proximate to the case in which they are to be located. This list of benefits is not exhaustive. These are just examples of many potential benefits.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing tobacco-oriented goods, the method comprising:
receiving a pick-up signal from a pick-up sensor, wherein the pick-up signal is indicative of the picking up of a tobacco product unit that has been pre-sorted based on inclusion in an associated order;
receiving a put-down signal from a put-down sensor, which the put-down signal is indicative of the fact that the tobacco product unit has been put down;

determining, based on a system parameter, whether the pick-up signal is properly associated with the put-down signal and wherein receiving a pick up signal further comprises receiving a pick up signal indicative of the picking up of a tobacco product unit that has been pre-sorted based on an identifier attached to the tobacco product unit.

2. The method of claim 1, wherein receiving a pick-up signal further comprises receiving a pick-up signal following a picking up of multiple tobacco product units including said tobacco product unit.

3. The method of claim 1, wherein receiving a pick-up signal further comprises receiving a pick-up signal following a picking up six tobacco product units including said tobacco product unit.

4. The method of claim 1, wherein receiving a pick-up signal from a pick-up sensor comprises receiving a pick-up signal from a photo-eye sensor.

5. The method of claim 1, wherein receiving a pick-up signal from a pick-up sensor comprises receiving a pick-up signal from a sensor positioned proximate to a sorting mechanism configured to sort a plurality of tobacco product units based on at least one order parameter, said tobacco product unit being one of the plurality of tobacco product units.

6. The method of claim 1, wherein receiving a put-down signal comprises receiving a put-down signal that is configured to sense when the tobacco product unit has been placed into a shipping container.

7. The method of claim 1, wherein receiving a put-down signal comprises receiving a put-down signal that is configured to sense into which of a plurality of shipping containers the tobacco product unit has been placed.

8. The method of claim 1, wherein receiving a put-down signal comprises receiving a put-down signal that is configured to identify which of a plurality of locations is the location at which the tobacco product unit has been placed.

9. A materials handling system for processing tobacco-oriented goods, the system comprising:

a sorting mechanism configured to physically distribute tobacco product units into a plurality of groups based on an order-oriented characteristic;

a pick-up sensor configured to produce a pick-up signal when a unit has been removed from one of the plurality of groups for packaging purposes;

a put-down sensor configured to produce a put-down sensor indicative of a location where the unit removed for packaging purposes has been put down; and wherein the sorting mechanism is configured to physically distribute tobacco product units into a plurality of groups, at least two groups being divided based on a characteristic that allows units from the same order to be in different groups.

10. The system of claim 9, further comprising a processing mechanism configured to determine, based on a system parameter, whether the pick-up signal is properly associated with the put-down signal.

11. The system of claim 9, further comprising a monitoring mechanism configured to trigger an exception routine if the pick-up signal is not properly associated with the put-down signal.

12. A computer-implemented method for processing tobacco-oriented goods, the method comprising:

receiving a pick-up signal from a pick-up sensor, wherein the pick-up signal is indicative of the picking up of a tobacco product unit that has been pre-sorted based on inclusion in an associated order;

receiving a put-down signal from a put-down sensor, which the put-down signal is indicative of the fact that the tobacco product unit has been put down;

determining, based on a system parameter, whether the pick-up signal is properly associated with the put-down signal; and wherein receiving a pick up signal further comprises receiving a pick up signal indicative of the picking up of a tobacco product unit that has been pre-sorted based on a barcode identifier attached to the tobacco product unit.

13. The method of claim 12, wherein receiving a pick-up signal further comprises receiving a pick-up signal following a picking up of multiple tobacco product units including said tobacco product unit.

14. The method of claim 12, wherein receiving a pick-up signal further comprises receiving a pick-up signal following a picking up six tobacco product units including said tobacco product unit.

15. The method of claim 12, wherein receiving a pick-up signal from a pick-up sensor comprises receiving a pick-up signal from a photo-eye sensor.

16. The method of claim 12, wherein receiving a pick-up signal from a pick-up sensor comprises receiving a pick-up signal from a sensor positioned proximate to a sorting mechanism configured to sort a plurality of tobacco product units based on at least one order parameter, said tobacco product unit being one of the plurality of tobacco product units.

17. The method of claim 12, wherein receiving a put-down signal comprises receiving a put-down signal that is configured to sense when the tobacco product unit has been placed into a shipping container.

18. The method of claim 12, wherein receiving a put-down signal comprises receiving a put-down signal that is configured to sense into which of a plurality of shipping containers the tobacco product unit has been placed.

19. The method of claim 12, wherein receiving a put-down signal comprises receiving a put-down signal that is configured to identify which of a plurality of locations is the location at which the tobacco product unit has been placed.

20. A materials handling system for processing tobacco-oriented goods, the system comprising:

a sorting mechanism configured to physically distribute tobacco product units into a plurality of groups based on an order-oriented characteristic;

a pick-up sensor configured to produce a pick-up signal when a unit has been removed from one of the plurality of groups for packaging purposes;

a put-down sensor configured to produce a put-down sensor indicative of a location where the unit removed for packaging purposes has been put down; and an information gathering system for associating an identity with each tobacco product unit prior to being made available to the sorting mechanism.

21. The system of claim 20, further comprising a processing mechanism configured to determine, based on a system parameter, whether the pick-up signal is properly associated with the put-down signal.

22. The system of claim 20, further comprising a monitoring mechanism configured to trigger an exception routine if the pick-up signal is not properly associated with the put-down signal.

23. A materials handling system for processing tobacco-oriented goods, the system comprising:

a sorting mechanism configured to physically distribute tobacco product units into a plurality of groups based on an order-oriented characteristic;

a pick-up sensor configured to produce a pick-up signal when a unit has been removed from one of the plurality of groups for packaging purposes;

a put-down sensor configured to produce a put-down sensor indicative of a location where the unit removed for packaging purposes has been put down; and an information gathering system for collecting barcode information associated with each tobacco product unit prior to being made available to the sorting mechanism.

24. The system of claim 23, further comprising a processing mechanism configured to determine, based on a system parameter, whether the pick-up signal is properly associated with the put-down signal.

25. The system of claim 23, further comprising a monitoring mechanism configured to trigger an exception routine if the pick-up signal is not properly associated with the put-down signal.

* * * * *